US007926887B2

(12) United States Patent
Ohkubo

(10) Patent No.: US 7,926,887 B2
(45) Date of Patent: Apr. 19, 2011

(54) BRAKE CONTROL SYSTEM AND BRAKE CONTROL METHOD

(75) Inventor: Masayasu Ohkubo, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 848 days.

(21) Appl. No.: 11/540,580

(22) Filed: Oct. 2, 2006

(65) Prior Publication Data

US 2007/0090690 A1 Apr. 26, 2007

(30) Foreign Application Priority Data

Oct. 20, 2005 (JP) ................... 2005-305701

(51) Int. Cl.
*B60T 8/88* (2006.01)
*B60T 13/74* (2006.01)
(52) U.S. Cl. ............... 303/122.03; 303/191; 303/DIG. 2
(58) Field of Classification Search ............ 303/122.03–122.05, 122.09, 122.1, 303/122.12, 191, DIG. 1, DIG. 2
See application file for complete search history.

(56) References Cited

U.S. PATENT DOCUMENTS

| 5,413,404 | A | 5/1995 | Inagawa | 303/122.12 |
|---|---|---|---|---|
| 6,132,012 | A | 10/2000 | Ishii | 303/122.12 |
| 6,276,763 | B1 * | 8/2001 | Isono et al. | 303/114.1 |
| 6,280,008 | B1 * | 8/2001 | Yoshida | 303/155 |
| 6,289,271 | B1 * | 9/2001 | Isono et al. | 701/31 |
| 6,425,644 | B2 * | 7/2002 | Kawahata et al. | 303/122 |
| 2007/0108837 | A1 * | 5/2007 | Ohkubo et al. | 303/122.08 |

FOREIGN PATENT DOCUMENTS

| DE | 44 19 520 A1 | 12/1994 |
|---|---|---|
| JP | 5-310119 | 11/1993 |
| JP | 6-300013 | 10/1994 |
| JP | 10-2444936 | 9/1998 |
| JP | 11-286271 | 10/1999 |
| JP | 2000-219128 | 8/2000 |
| JP | 2002-347593 | 12/2002 |
| JP | 2005-35471 | 2/2005 |

\* cited by examiner

*Primary Examiner* — Melody M Burch
(74) *Attorney, Agent, or Firm* — Oblon, Spivak, McClelland, Maier & Neustadt, L.L.P.

(57) ABSTRACT

A brake control system includes at least one wheel cylinder that receives the work fluid to apply a braking force to a corresponding vehicle wheel, a wheel cylinder pressure control system that controls the control pressure applied to the at least one wheel cylinder by controlling the supply of the work fluid thereto, a first abnormality determination unit that determines whether an abnormality in the wheel cylinder pressure control system based on an initial response characteristic of the control pressure after a braking request within a predetermined abnormality determination time, and a second abnormality determination unit that determines whether the abnormality in the wheel cylinder pressure system is present based on a comparison between the control pressure and a reference pressure based on which the determination is made with respect to the abnormality within a predetermined second abnormality determination time that is set to expire before expiration of the first abnormality determination time.

13 Claims, 7 Drawing Sheets

BRAKE CONTROL SYSTEM AND BRAKE CONTROL METHOD

INCORPORATION BY REFERENCE

The disclosure of Japanese Patent Application No. 2005-305701 filed on Oct. 20, 2005 including the specification, drawings and abstract is incorporated herein by reference in its entirety.

BACKGROUND OF THE INVENTION

1. Field of the Invention

The invention relates to a brake control system and a brake control method that control the braking force applied to the wheels of a vehicle.

2. Description of the Related Art

An electronically controlled brake apparatus that detects the control pressure at each wheel cylinder respectively provided for the wheels of a vehicle and executes a feedback control of the wheel cylinder pressure at each wheel cylinder to a target value is described in Japan Patent Application Publication No. JP-A-2005-35471. The described brake apparatus is structured to avoid application of electric current to the electromagnetic flow control valve that supplies the work fluid to the wheel cylinders for a long period in the event an abnormality causes the control pressure to deviate from the target pressure.

In a normal state of the system, application of the braking force to the respective wheels may lag the depression of the brake pedal by the driver because of the time needed to increase the control pressure to be applied to the wheel cylinders. This is because the braking control system is designed by placing the emphasis on stability, and the wheel cylinders and the pipe connected thereto exhibit elasticity as the influencing factor. When the work fluid is supplied to the wheel cylinders in response to the braking request, it is likely that the diameter of the wheel cylinder or the pipe elastically expands initially, resulting in a gentle increase in the control pressure within the wheel cylinder at the initial stage. Shortly thereafter, the control pressure will start increasing steeply to the target pressure value.

Normally, the target pressure value of the control pressure immediately after the braking request increases linearly as time passes. Accordingly the control pressure immediately after the braking request is likely to become lower than the target pressure value even in the normal state of the system. In the case where the system abnormality occurs and the braking force in accordance with the braking request cannot be normally generated, it is necessary to start another system provided for the fail safe function so as to generate the braking force.

SUMMARY OF THE INVENTION

It is an object of the invention to provide a brake control system and a brake control method capable of promptly detecting a response abnormality in the control pressure upon the braking request.

A brake control system according to a first aspect of the invention is provided with at least one wheel cylinder that receives a supply of a work fluid so as to apply a braking force to each of a respective vehicle wheel, a wheel cylinder pressure control system that controls a control pressure applied to the at least one wheel cylinder by controlling the supply of the work fluid to the at least one wheel cylinder, a first abnormality determination unit that determines whether an abnormality in the wheel cylinder pressure control system is present based on an initial response characteristic of the control pressure after a braking request within a predetermined first abnormality determination time, and a second abnormality determination unit that determines whether the abnormality in the wheel cylinder pressure control system is present based on a comparison between the control pressure and a reference pressure based on which a determination is made with respect to the abnormality within a predetermined second abnormality determination time that is set to expire before expiration of the first abnormality determination time.

In the aforementioned first aspect, the abnormality in the wheel cylinder pressure control system may be detected by the first abnormality determination unit within the first abnormality determination period, and by the second abnormality determination unit within the second abnormality determination period. The second abnormality determination period is set to expire prior to expiration of the first abnormality determination period. The second abnormality determination unit preliminarily sets the reference pressure, based on which an abnormality determination is made, in advance of the first abnormality determination unit. This makes it possible to promptly detect the response abnormality in the control pressure upon the braking request.

The wheel cylinder pressure control system may include a booster control valve that supplies the work fluid to a plurality of wheel cylinders. The ratio of the flow rate of the work fluid supplied from the booster control valve to the capacity of the wheel cylinder that receives the work fluid is one factor that determines the response of the control pressure. If the booster control valve is standardized, the capacity that receives the work fluid increases relative to the flow rate of the work fluid to be supplied, thus deteriorating the response. In the first aspect, the second abnormality determination unit determines with respect to the abnormality in the wheel cylinder pressure control system in advance of the determination made by the first abnormality determination unit. This makes it possible to promptly detect the abnormality in the brake upon the braking request.

In the first aspect of the invention, the first abnormality determination unit may be designed to determine whether the abnormality in the wheel cylinder pressure control system is present based on a comparison between a calculated pressure obtained in accordance with a required braking force and the control pressure. The determination with respect to the abnormality in the wheel cylinder pressure control system may be made based on the response of the control pressure to the calculated pressure obtained in accordance with the required braking force. This makes it possible to make a determination with respect to abnormalities such as the control delay or control failure in the wheel cylinder pressure control system.

In the first aspect, the first abnormality determination unit may be designed to determine that the wheel cylinder pressure control system has the abnormality if a time at which a deviation of the control pressure from the calculated pressure exceeds a predetermined reference deviation has reached the first abnormality determination time. This makes it possible to detect the control delay in the wheel cylinder pressure control system.

In the aforementioned case, the calculated pressure may be a target value of the control pressure. This makes it possible to determine whether the control pressure follows up the target value, that is, the control pressure has a normal transition.

In the first aspect, the calculated pressure may be an estimated control pressure obtained based on a command current applied to the booster control valve for supplying the work fluid to the at least one wheel cylinder, a feature of a flow rate to the command current applied to the booster control valve, and a feature of a fluid consumption amount of the at least one wheel cylinder. This makes it possible to determine whether the control pressure has a normal transition.

In the first aspect, the reference pressure may be a predetermined response delay determination reference pressure based on which a determination is made with respect to a response delay abnormality in the control pressure. The second abnormality determination unit may be structured to determine with respect to the abnormality in the wheel cylinder pressure control system based on a time taken for the control pressure to reach the response delay determination reference pressure. The excessive delay in the response of the control pressure, owing to the closing failure of the booster control valve, which supplies the work fluid to the wheel cylinder, or insufficient flow rate of the work fluid, may be detected promptly. This makes it possible to switch the system to the other one quickly so as to generate the braking force.

In the first aspect, the second abnormality determination unit may be structured to determine that the wheel cylinder pressure control system has the abnormality if the time needed for the control pressure to reach the response delay determination reference pressure exceeds the second abnormality determination time. In the case where the control pressure fails to reach the response delay determination reference pressure value upon expiration of the second abnormality determination time, it may be determined that the wheel cylinder pressure control system has the abnormality. Accordingly, the abnormality may be promptly detected without waiting for the determination made by the first abnormality determination unit.

In the first aspect, the response delay determination reference pressure may be set to a predetermined low pressure value as a threshold value based on which a determination is made with respect to an increase of the control pressure to the target value. This makes it possible to set the response delay determination reference pressure value appropriately.

In the first aspect, the reference pressure may be a predetermined response advance determination reference pressure based on which a determination is made with respect to a response advance abnormality in the control pressure. The second abnormality determination unit may be structured to determine that the wheel cylinder pressure control system has the abnormality upon establishment of a condition that the control pressure exceeds the response advance determination reference pressure before expiration of the second abnormality determination time.

In the first aspect, if the control pressure exceeds the response advance determination reference pressure before expiration of the second abnormality determination time, it may be determined that the wheel pressure control system has the abnormality. This makes it possible to promptly detect the abnormality caused by the opening failure of the booster control valve which supplies the work fluid to the wheel cylinder and leakage abnormality, or the response advance abnormality of steep increase in the control pressure caused by the failure to linearly control the opening of the control valve without waiting for the determination made by the first abnormality determination unit.

In the first aspect, the second abnormality determination unit may be designed to determine that the wheel cylinder pressure control system has the abnormality if the control pressure exceeds the response advance determination reference pressure upon expiration of the second abnormality determination time. This makes it possible to promptly detect the response advance abnormality.

In the first aspect, the response advance determination reference pressure may be set based on a maximum value of a pressure gradient of the control pressure that is allowed to be generated by the wheel cylinder pressure control system. This makes it possible to appropriately set the response advance determination reference pressure.

In the first aspect, the second abnormality determination time may include a predetermined response advance determination reference time for determining with respect to a response advance abnormality of the control pressure, and a predetermined response delay determination reference time preliminarily set to expire after expiration of the response advance determination reference time for determining with respect to a response delay abnormality in the control pressure. The reference pressure may include a predetermined response advance determination reference pressure for determining with respect to the response advance abnormality of the control pressure, and a predetermined response delay determination reference pressure preliminarily set to be lower than the response advance determination reference pressure for determining with respect to the response delay abnormality in the control pressure. The second abnormality determination unit may be designed to determine that the wheel cylinder pressure control system has the abnormality upon establishment of one of conditions that the control pressure exceeds the response advance determination reference pressure upon expiration of the response advance determination reference time, and that the time taken for the control pressure to reach the response delay determination reference pressure exceeds the response delay determination reference time.

The system may be structured to detect both the advance abnormality and delay abnormality in the response of the control pressure. In this aspect, the response advance abnormality is detected prior to the detection of the response delay abnormality. Such structure is preferable as it is capable of preventing generation of the excessive braking force over the required braking force.

According to a second aspect of the invention, a method for determining an abnormality within a brake control system comprising at least one wheel cylinder that receives a supply of a work fluid so as to apply a braking force to a respective vehicle wheel, and a wheel cylinder pressure control system that controls a control pressure applied to the at least one wheel cylinder by controlling the supply of the work fluid to the at least one wheel cylinder; comprising the steps of: determining whether an abnormality in the wheel cylinder pressure control system is present based on an initial response characteristic of the control pressure after a braking request within a predetermined first abnormality determination time; and determining whether the abnormality in the wheel cylinder pressure control system is present based on a comparison between the control pressure and a reference pressure within a predetermined second abnormality determination time that is set to expire before expiration of the first abnormality determination time.

The invention allows the prompt detection of the response abnormality in the control pressure upon the braking request.

BRIEF DESCRIPTION OF THE DRAWINGS

The foregoing and further objects, features and advantages of the invention will become apparent from the following description of example embodiments with reference to the accompanying drawings, wherein the same or corresponding portion are denoted by the same reference numerals and wherein.

DETAILED DESCRIPTION OF THE PREFERRED EMBODIMENTS

Figure 1:
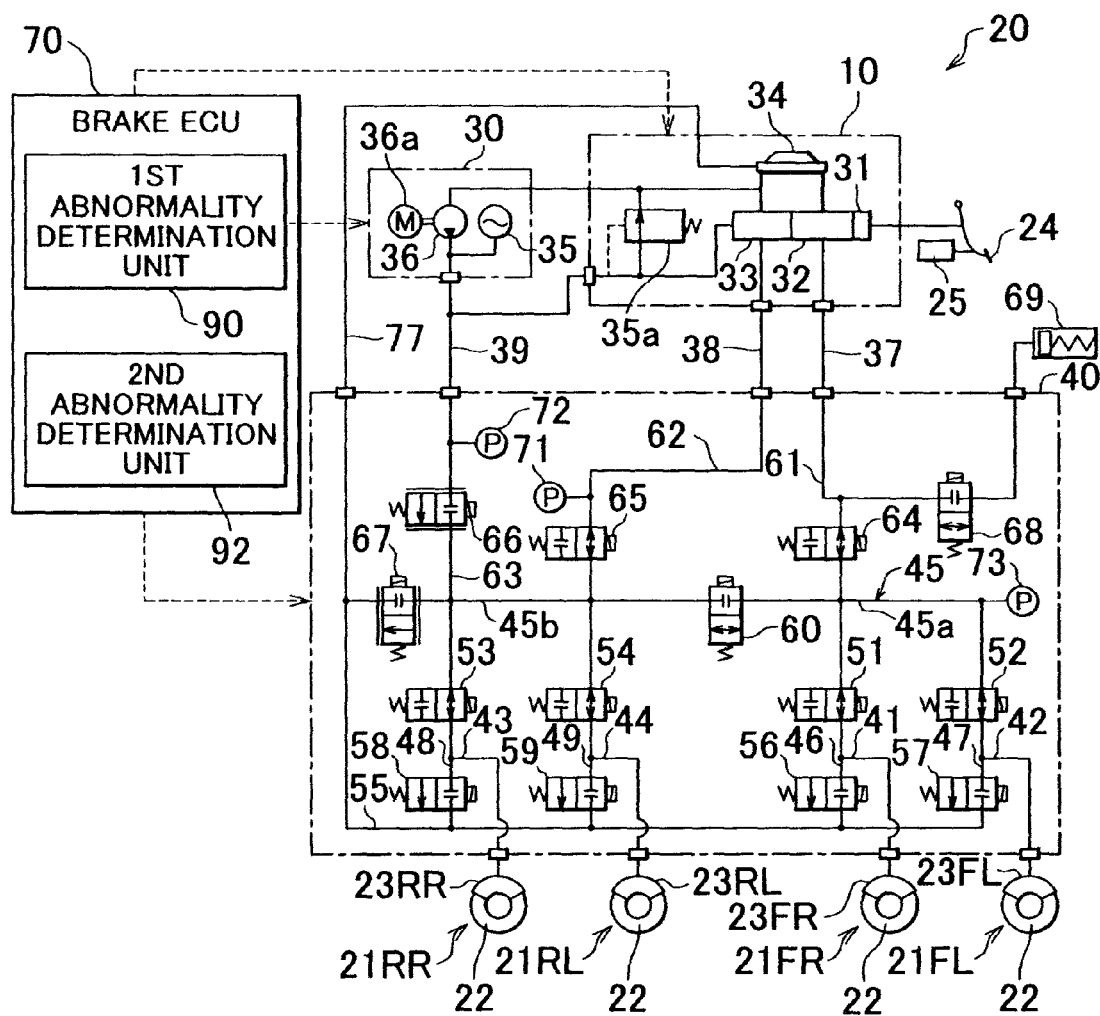
FIG. 1 is a view schematically showing a brake control system according to a first embodiment of the invention.

The best mode for carrying out the invention will be described in detail referring to the drawings.

FIG. 1 is a view showing a structure of a brake control system 20 according to a first embodiment of the invention. The brake control system 20 forms an electronically controlled brake system (ECB) for a vehicle that controls braking forces applied to four wheels of the vehicle. The brake control system 20 of the embodiment may be installed in, for example a hybrid vehicle having the power source formed of the electric motor and the internal combustion engine. The hybrid vehicle uses the regenerative braking, which regenerates the motion energy of the vehicle to the electric energy, and the hydraulic braking, generated by the brake control system 20, for braking the vehicle. The vehicle provided with the system of the embodiment may execute a regenerative braking collaborative control by combining the regenerative braking and the hydraulic braking so as to generate the desired braking force.

The brake control system 20 includes disc brake units 21FR, 21FL, 21RR and 21 RL as the braking force application mechanisms each provided for the wheels (not shown), a master cylinder unit 10, a power hydraulic source 30, and a hydraulic actuator 40.

The disc brake units 21FR, 21FL, 21RR, and 21RL apply braking forces to the right front wheel, left front wheel, right rear wheel, and left rear wheel, respectively. The master cylinder unit 10 supplies the brake fluid pressurized in accordance with the amount of operation of the brake pedal 24 as a brake operation member to the disc brake units 21FR to 21RL, respectively. The power hydraulic source 30 is allowed to supply the brake fluid as the work fluid pressurized by the power supplied thereto to the disc brake units 21FR to 21RL, respectively independent from the driver's operation to the brake pedal 24. The hydraulic actuator 40 adjusts the hydraulic pressure of the brake fluid supplied from the power hydraulic source 30 or the master cylinder unit 10 so as to be supplied to the disc brake units 21FR to 21RL, respectively. The braking forces to the respective wheels may be adjusted through the hydraulic braking. In the embodiment, a wheel cylinder pressure control system is formed of the power hydraulic source 30 and the hydraulic actuator 40.

The disc brake units 21FR to 21RL, the master cylinder unit 10, the power hydraulic source 30, and the hydraulic actuator 40 will be explained in detail, respectively. The disc brake units 21FR to 21RL include brake discs 22 and wheel cylinders 23FR to 23RL built in brake calipers, respectively. The wheel cylinders 23FR to 23RL are connected to the hydraulic actuator 40 via different flow channels, respectively. The wheel cylinders 23FR to 23RL will be collectively referred to as "wheel cylinders 23" hereinafter.

In the disc brake units 21FR to 21RL, when the brake fluid is supplied from the hydraulic actuator 40 to the wheel cylinders 23, brake pads serving as friction members are pressed against the brake discs 22 which rotate with the wheels. Accordingly the braking forces are applied to the respective wheels. Besides the disc brake units 21FR to 21RL used in the embodiment, other braking force application mechanism such as a drum brake including a wheel cylinder 23 may be employed.

The master cylinder unit 10 as the master cylinder with a hydraulic booster includes a hydraulic booster 31, a master cylinder 32, a regulator 33, and a reservoir 34. The hydraulic booster 31 is connected to the brake pedal 24 for boosting the pedal effort applied to the brake pedal 24 so as to be transferred to the master cylinder 32. As the brake fluid is supplied from the power hydraulic source 30 to the hydraulic booster 31 via the regulator 33, the pedal effort may be boosted. The master cylinder 32 generates a master cylinder pressure at a predetermined servo ratio with respect to the pedal effort.

The reservoir 34 that retains the brake fluid is disposed upstream of the master cylinder 32 and the regulator 33. The master cylinder 32 communicates with the reservoir 34 while the brake pedal 24 is not depressed. Meanwhile, the regulator 33 communicates with both the reservoir 34 and an accumulator 35 of the power hydraulic source 30. The reservoir 34 serves as the low pressure source, and the accumulator 35 serves as the high pressure source such that hydraulic pressure substantially equal to the master cylinder pressure is generated. The hydraulic pressure at the regulator 33 will be hereinafter referred to as the "regulator pressure".

The power hydraulic source 30 includes the accumulator 35 and a pump 36. The accumulator 35 converts the pressure energy of the brake fluid boosted by the pump 36 into the pressure energy of the filler gas such as nitrogen gas at around 14 to 22 MPa, for example, so as to be accumulated therein. The pump 36 includes a motor 36a as a driving source having a suction inlet connected to the reservoir 34, and a discharge outlet connected to the accumulator 35. The accumulator 35 is also connected to a relief valve 35a provided in the master cylinder unit 10. If the pressure of the brake fluid within the accumulator 35 should increase to around 25 MPa, for example, the relief valve 35a is opened to return the high pressure brake fluid into the reservoir 34.

The brake control system 20 is provided with the master cylinder 32, the regulator 33 and the accumulator 35 that supplies the brake fluid to the wheel cylinders 23. The master cylinder 32 is connected to a master pipe 37, the regulator 33 is connected to a regulator pipe 38, and the accumulator 35 is connected to an accumulator pipe 39, respectively. The master pipe 37, regulator pipe 38, and accumulator pipe 39 are connected to the hydraulic actuator 40, respectively.

The hydraulic actuator 40 includes an actuator block having a plurality of flow channels formed therein, and a plurality of electromagnetic control valves. The flow channels formed in the actuator block include sub-channels 41, 42, 43, and 44, and a main channel 45. The sub-channels 41 to 44 are branched from the main channel 45, and connected to the wheel cylinders 23FR, 23FL, 23RR, and 23RL of the corresponding disc brake units 21FR, 21FL, 21RR, and 21RL, respectively. This allows the respective wheel cylinders 23 to communicate with the main channel 45.

ABS holding valves 51, 52, 53 and 54 are provided at intermediate positions of the sub-channels 41, 42, 43 and 44, respectively. The ABS holding valves 51 to 54 are provided with solenoids, subjected to the switching control between ON and OFF, and springs. They are electromagnetic control valves of normally open type, which are normally open when electric current is not applied to the solenoids.

The wheel cylinders 23 are connected to a reservoir channel 55 via pressure reduction channels 46, 47, 48 and 49 connected to the sub-channels 41 to 44, respectively. ABS pressure reduction valves 56, 57, 58 and 59 are provided at intermediate positions of the pressure reduction channels 46, 47, 48 and 49, respectively. The ABS pressure reduction valves 56 to 59 are provided with solenoids, subjected to the switching control between ON and OFF, and springs. They are electromagnetic control valves of normally closed type, which are normally closed when electric current is not applied to the solenoids. The reservoir channel 55 is connected to the reservoir 34 of the master cylinder unit 10 via a reservoir pipe 77.

The main channel 45 is provided with a communication valve 60 at its intermediate position. The communication valve 60 is provided with a solenoid, subjected to the switching control between ON and OFF, and a spring. It is an electromagnetic control valve of normally closed type, which is normally closed when electric current is not applied to the solenoid. The main channel 45 is separated into a first channel 45a, which is connected to the sub-channels 41 and 42, and a second channel 45b, which is connected to the sub-channels 43 and 44, by the communication valve 60. The first channel 45a is connected to the wheel cylinders 23FR and 23FL of the front wheels via the sub-channels 41 and 42, and the second channel 45b is connected to the wheel cylinders 23RR and 23RL of the rear wheels via the sub-channels 43 and 44.

The hydraulic actuator 40 includes a master channel 61, a regulator channel 62, and an accumulator channel 63 each connected to the main channel 45. More specifically, the master channel 61 is connected to the first channel 45a of the main channel 45. The regulator channel 62 and the accumulator channel 63 are connected to the second channel 45b of the main channel 45. The master channel 61 is connected to the master pipe 37 communicated with the master cylinder 32. The regulator channel 62 is connected to the regulator pipe 38 communicated with the regulator 33. The accumulator channel 63 is connected to the accumulator pipe 39 communicated with the accumulator 35.

The main channel 45 connects the intermediate portion of the channel that connects the wheel cylinders 23RR, 23RL of the rear wheels and the power hydraulic source 30, and the intermediate portion of the channel that connects the wheel cylinders 23FR, 23FL of the front wheels and the master cylinder 32. The main channel 45 is provided with the communication valve 60 so as to switch between a communication state where the communication of the wheel cylinders 23FR, 23FL of the front wheels with the power hydraulic source 30 is established and a non-communication state where the communication between the wheel cylinders 23FR, 23FL of the front wheels and the power hydraulic source 30 is interrupted. In other words, when the communication valve 60 is opened, the communication is established, and when the communication valve 60 is closed, the communication is interrupted.

The master channel 61 is provided with a master cut valve 64 at the intermediate portion. The master cut valve 64 is provided with a solenoid, subjected to the switching control between ON and OFF, and a spring. It is an electromagnetically controlled valve of normally opened type, which is normally opened when the electric current is not applied to the solenoid. When the master cut valve 64 is opened, the wheel cylinders 23FR, 23FL of the front wheels are communicated with the master cylinder 32. Meanwhile, when the master cut valve 64 is closed, the communication between the wheel cylinders 23FR, 23FL of the front wheels and the master cylinder 32 is interrupted.

A stroke simulator 69 is connected to the master channel 61 at a portion upstream of the master cut valve 64 via a simulator cut valve 68. The simulator cut valve 68 is provided in the channel that connects the master cylinder 32 and the stroke simulator 69. The simulator cut valve 68 is provided with a solenoid, subjected to the switching control between ON and OFF, and a spring. It is an electromagnetically controlled valve of normally closed type, which is normally closed when the electric current is not applied to the solenoid. When the simulator cut valve 68 is opened, the stroke simulator 69 is communicated with the master cylinder 32. Meanwhile, when the simulator cut valve 68 is closed, the communication between the stroke simulator 69 and the master cylinder 32 is interrupted.

The stroke simulator 69 includes a plurality of pistons and springs, and generates the reaction force in accordance with the pedal effort of the brake pedal 24 applied by the driver upon opening of the simulator cut valve 68. Preferably the stroke simulator 69 is designed to have a multi-stage spring feature for the purpose of improving the driver's feel at the braking operation. The stroke simulator 69 in the embodiment has 4-stage spring feature.

The regulator channel 62 is provided with a regulator cut valve 65 having a solenoid subjected to the switching control between ON and OFF, and a spring. The regulator cut valve 65 is an electromagnetically controlled valve of normally opened type, which is opened when the electric current is not applied to the solenoid. When the regulator cut valve 65 is opened, the wheel cylinders 23RR and 23RL of the rear wheels are communicated with the regulator 33. Meanwhile, when the regulator cut valve 6 is closed, the communication between the wheel cylinders 23RR, 23RL of the rear wheels and the regulator 33 is interrupted.

The accumulator channel 63 is provided with a booster linear control valve 66 at the intermediate portion. The accumulator channel 63 and the second channel 45b of the main channel 45 are connected to the reservoir channel 55 via a pressure reduction linear control valve 66. Both the booster linear control valve 66 and the pressure reduction linear control valve 67 are provided with linear solenoids and springs, respectively, which are electromagnetically controlled valves of normally closed type. That is, they are normally closed when the electric current is not applied to the solenoids.

The booster linear control valve 66 is operated for a plurality of wheel cylinders 23 corresponding to the respective wheels as a common booster control valve. Likewise, the pressure reduction linear control valve 67 is operated for the plurality of wheel cylinders 23 corresponding to the respective wheels as the common pressure reduction control valve. In the embodiment, the booster linear control valve 66 and the pressure reduction linear control valve 67 serve as a pair of control valves commonly used for the respective wheel cylinders 23 such that the work fluid supplied from the power hydraulic source 30 is controlled to be supplied thereto or discharged therefrom.

The differential pressure between the outlet and inlet of the booster linear control valve 66 corresponds with the differential pressure of the brake fluid pressure between the accumulator 35 and the main channel 45. The differential pressure between the outlet and inlet of the pressure reduction linear control valve 67 corresponds with the differential pressure of the brake fluid between the main channel 45 and the reservoir 34. Assuming that the electromagnetic driving force in accordance with the power supplied to the linear solenoids of the booster linear control valve 66 and the pressure reduction linear control valve 67 is set to F1, the urging force of the spring is set to F2, and the differential pressure acting force in accordance with the differential pressure between the outlets and inlets of the booster linear control valve 66 and the pressure reduction control valve 67, respectively is set to F3, the relationship of F1+F3=F2 is established. The power supplied to the linear solenoids of the booster linear control valve 66 and the pressure reduction control valve 67 is continuously controlled so as to control the differential pressure between outlets and inlets of the booster linear control valve 66 and the pressure reduction linear control valve 67.

In the brake control system 20, the power hydraulic source 30 and the hydraulic actuator 40 are controlled by a brake ECU 70 including an abnormality determination unit. The brake ECU 70 is formed as a micro processor that contains a CPU as well as a ROM that stores various programs, a RAM that temporarily stores data, input/output ports, communication ports, and the like. The brake ECU 70 may be communicated with a hybrid ECU at a higher order (not show) so as to execute a regenerative braking collaborative control by controlling the pump 36 of the power hydraulic pressure source 30, electromagnetic control valves 51 to 54, 56 to 59, 60, and 64 to 68 that constitute the hydraulic actuator 40 based on the control signals from the hybrid ECU and signals from various sensors. The brake ECU 70 is allowed to control the switching operation between ON and OFF of the respective electromagnetic control valves independently from the driver's operation to the brake pedal 24.

The brake ECU 70 is connected to a regulator pressure sensor 71, an accumulator pressure sensor 72, and a control pressure sensor 73. The regulator pressure sensor 71 detects a pressure of the brake fluid within the regulator channel 62, that is, the regulator pressure at a portion upstream of the regulator cut valve 65. The signal indicating the detected value is sent to the brake ECU 70. The accumulator pressure sensor 72 detects the pressure of the brake fluid within the accumulator channel 63, that is, the accumulator pressure at the portion upstream of the booster linear control valve 66. The signal indicating the detected value is sent to the brake ECU 70. The control pressure sensor 73 detects the pressure of the brake fluid within the first channel 45*a* of the main channel 45, and sends the signal indicating the detected value to the brake ECU 70. The detected values of the respective pressure sensors 71 to 73 are sequentially sent to the brake ECU 70 at the time interval so as to be stored in a predetermined storage area of the brake ECU 70 by a predetermined size.

In the case where the first channel 45*a* and the second channel 45*b* of the main channel 45 are communicated with each other when opening the communication valve 60, the output value of the control pressure sensor 73 represents the hydraulic pressure at the low pressure side of the booster linear control valve 66, and also the hydraulic pressure at the high pressure side of the pressure reduction linear control valve 67. The aforementioned output value, thus, may be used for controlling the booster linear control valve 66 and the pressure reduction linear control valve 67. In the case where the booster linear control valve 66 and the pressure reduction linear control valve 67 are closed, and the master cut valve 64 is opened, the output value of the control pressure sensor 73 represents the master cylinder pressure. In the case where the communication valve 60 is opened to establish the communication between the first and the second channels 45*a* and 45*b* of the main channel 45, the ABS holding valves 51 to 54 are opened, and the ABS pressure reduction valves 56 to 59 are closed, the output value of the control pressure sensor 73 represents the work fluid pressure applied to the respective wheel cylinders 23, that is, the wheel cylinder pressure.

A stroke sensor 25 attached to the brake pedal 24 is also connected to the brake ECU 70. The stroke sensor 25 detects the pedal stroke as an operation amount to the brake pedal 24 such that the signal indicating the detected value is sent to the brake ECU 70. The output value of the stroke sensor 25 is also sent to the brake ECU sequentially at a predetermined time interval so as to be stored in the predetermined storage area of the brake ECU 70 by a predetermined size. A braking state detection unit other than the stroke sensor 25 may be added thereto, or provided in place thereof so as to be connected to the brake ECU 70. The braking state detection unit may include a pedal effort sensor that detects the operation amount to the brake pedal 24, and a brake switch that detects the depression of the brake pedal 24.

The above-structured brake control system 20 is allowed to take at least two control modes including the regenerative collaborative control mode and a hydro booster mode. In either mode, the brake control system 20 starts braking in response to the braking request. The braking request is generated as the braking force is required to be applied to the vehicle. The braking request may be generated when the driver operates the brake pedal 24, the distance from the vehicle running ahead becomes smaller than the predetermined value during running under the cruise control, and the like.

In the regenerative collaborative control mode, the regenerative braking collaborative control is executed. In response to the braking request, the brake ECU 70 subtracts the braking force from the required total braking force so as to calculate the required hydraulic braking force as the braking force to be generated by the brake control system 20. The braking force derived from the regeneration is supplied to the brake control system 20 from the hybrid ECU. The brake ECU 70 calculates the target hydraulic pressures of the respective wheel cylinders 23FR to 23RL based on the calculated required hydraulic braking force. Values of the current applied to the booster linear control valve 66 and the pressure reduction linear control valve 67 may be determined.

In the brake control system 20, the brake fluid is supplied to the wheel cylinders 23 from the power hydraulic source 30 via the booster linear control valve 66 such that the braking force is applied to the respective wheels. The brake fluid is discharged from the wheel cylinders 23 via the pressure reduction linear control valve 67 if needed such that the braking force applied to the wheels may be regulated. In the regenerative collaborative control mode, the brake ECU 70 closes the master cut valve 64, and opens the simulator cut valve 68 such that the brake fluid supplied from the master cylinder 32 accompanied with the driver's operation to the brake pedal 24 is supplied to the stroke simulator 69.

During the braking operation, a first abnormality determination unit 90 in the brake ECU 70 determines whether the wheel cylinder pressure control system has an abnormality based on the response of the control hydraulic pressure applied to the wheel cylinders. Specifically, in the embodiment, the first abnormality determination unit 90 determines that there is the abnormality caused by the control failure that the control hydraulic pressure fails to follow the target hydraulic pressure if the state where the deviation of the control hydraulic pressure from the target value exceeds a reference value continues over a predetermined time period.

If the brake ECU 70 detects the abnormality in the brake control system 20 under the control in the regenerative collaborative control mode, the brake ECU 70 stops the control in the regenerative collaborative control mode to alert the user of the abnormality, and supplies the brake fluid to the wheel cylinders 23 from the other system. In the embodiment, the control is switched to the one in the hydro booster mode. In the hydro booster mode, the brake fluid is supplied from the master cylinder unit 10 to the respective wheel cylinders 23 such that the braking force is applied to the wheels. In this case, the brake ECU 70 switches the operation state of the master cut valve 64 from the closed state to the opened state, and that of the simulator cut valve 68 from the opened state to the closed state so as to supply the brake fluid from the master cylinder 32 to the wheel cylinders 23FR and 23FL of the front wheels.

In the regenerative collaborative control mode according to the embodiment, the brake fluid is supplied to the wheel cylinders 23 from the power hydraulic source 30, not from the master cylinder 32. This makes it possible to generate the braking force independently from the driver's operation amount to the brake pedal 24. In view of the fail safe function, it is preferable to determine whether the braking force is normally generated within a short period of time in response to every braking request. In the determination process of the first abnormality determination unit 90, however, the determination with respect to the abnormality that occurs upon the braking request may take a longer time for the following reasons.

In the normally operated system, a certain time may be taken from the braking request to raise the control hydraulic pressure until its deviation from the target hydraulic pressure becomes smaller than the reference deviation value. This is because the braking force is intended to be controlled with the emphasis on the safety. Besides, such time lag may be caused by the elasticity of the wheel cylinder or the pipe connected thereto. Even if the work fluid is normally supplied to the wheel cylinders in response to the braking request, the wheel cylinders or the pipe may be expanded prior to the rise-up of the control hydraulic pressure applied to the wheel cylinder.

Immediately after the braking request, the target hydraulic pressure tends to increase as time passes. Accordingly, the control hydraulic pressure is likely to deviate from the target hydraulic pressure value even in the normal state. In the embodiment, the supply/discharge of the brake fluid with respect to the respective wheel cylinders 23FR to 23RL is controlled by a pair of commonly used booster linear control valve 66 and pressure reducing linear control valve 67. The ratio of the flow rate of the brake fluid supplied from the booster linear control valve 66 to the capacity of the wheel cylinder 23 to which the brake fluid is supplied is one of important factors that determine the delay time in the rise-up of the control hydraulic pressure in response to the braking request. It is preferable to commonly use the booster linear control valve 66 and the like for the respective wheel cylinders 23 in view of the cost reduction. However, as the whole capacity of the cylinders to which the brake fluid is supplied will be increased relative to the flow rate of the brake fluid to be supplied, thus further taking longer time for the rise-up of the control hydraulic pressure.

Figure 2:
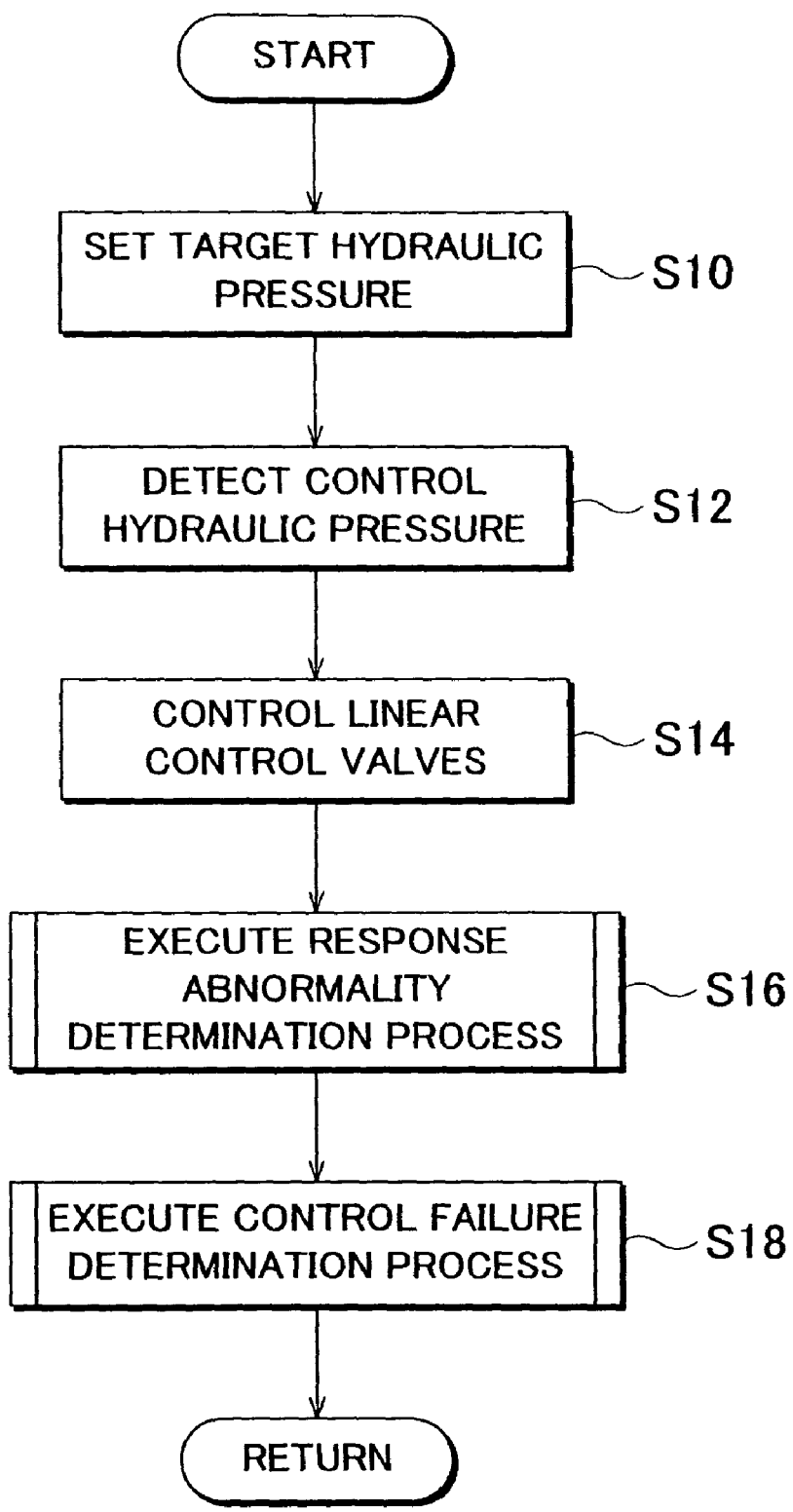
FIG. 2 is a flowchart of a control routine of an abnormality determination process in the first embodiment.

The brake control system 20 according to the embodiment is provided with a second abnormality determination unit 92 that determines with respect to the abnormality in the brake prior to the determination made by the first abnormality determination unit 90 such that the abnormality in the brake in response to the braking request may be promptly detected. FIG. 2 is a flowchart of a control routine of the abnormality determination process according to the first embodiment. Referring to FIG. 2, the abnormality determination process according to the embodiment will be described hereinafter. The process as shown in the flowchart of FIG. 2 is repeatedly executed at a predetermined time interval from the braking request, for example, at the time interval of 3 to 6 msecs.

Referring to the flowchart shown in FIG. 2, first in step S10, upon start of the process according to the embodiment, the brake ECU 70 sets target hydraulic pressures of the respective wheel cylinders in response to the braking request. The target hydraulic pressure is set based on the required hydraulic pressure braking force as described above. Then in step S12, the brake ECU 70 receives the signal indicating the detection value of the control hydraulic pressure from the control pressure sensor 73. The brake ECU 70 controls the booster linear control valve 66, and the pressure reduction linear control valve 67, if required, and supplies the brake fluid that has been fed from the power hydraulic source 30 to the respective wheel cylinders so as to control the control hydraulic pressures to the respective wheel cylinders become the target values in step S14.

In step S16, the second abnormality determination unit 92 of the brake ECU 70 makes a determination with respect to the response abnormality. Likewise the first abnormality determination unit 90, the second abnormality determination unit 92 is installed in the brake ECU 70. Then in step S18, the first abnormality determination unit 90 makes the determination with respect to the control failure. If no abnormality is detected in the determination with respect to the response abnormality and the control failure, the abnormality determination process according to the embodiment ends, and the process will be executed again at the subsequent cycle. If the abnormality is detected in the determination with respect to the response abnormality or the control failure, the brake ECU 70 terminates the abnormality determination process upon detection of the abnormality so as to switch the control mode from the regenerative braking collaborative control mode to the other mode, for example, hydro booster mode and the like to generate the braking force.

Figure 3:
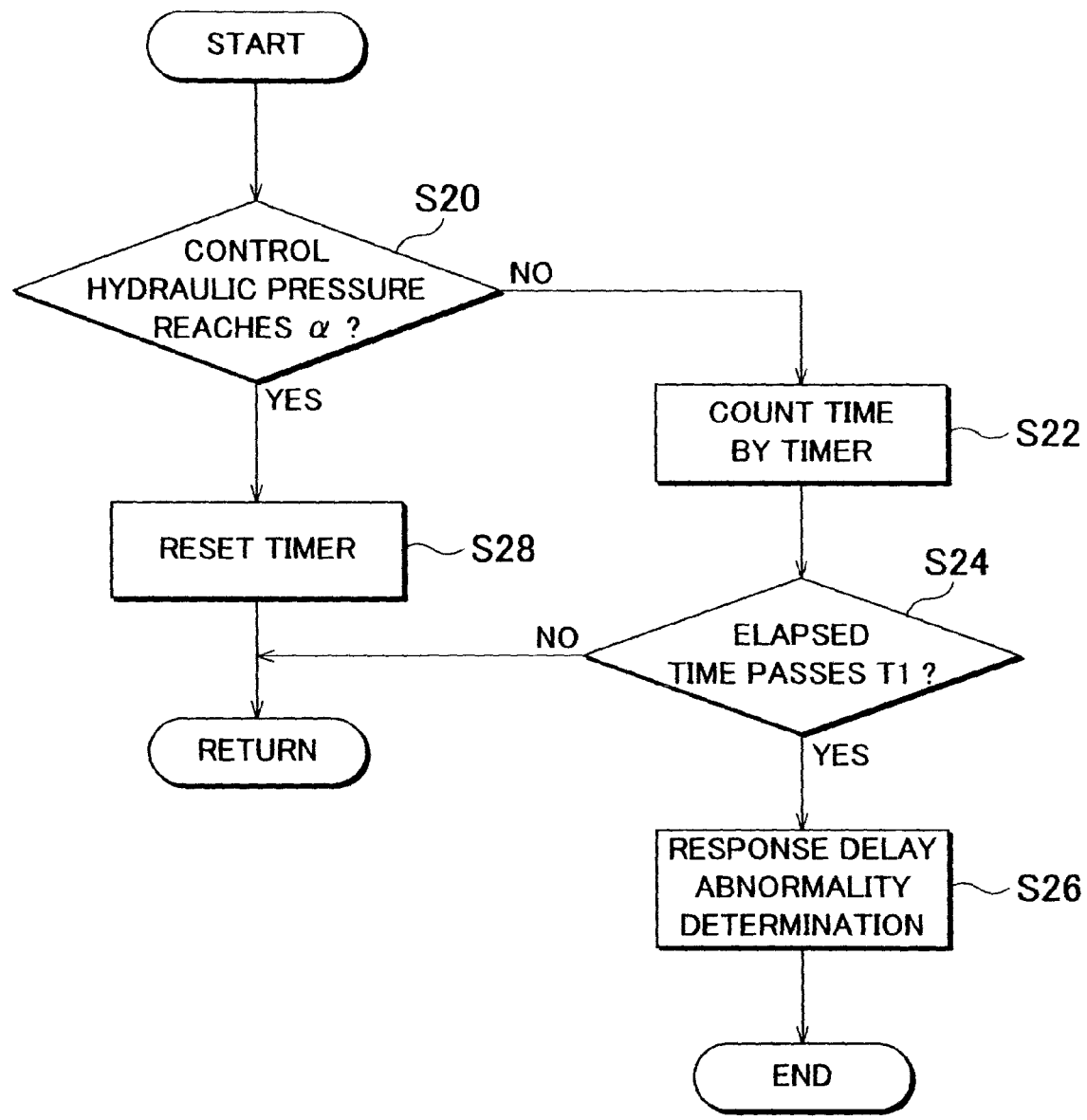
FIG. 3 is a flowchart of a response abnormality determination in the first embodiment.

FIG. 3 is a flowchart of the process for determining the response abnormality executed in step S16 in the first embodiment. Upon start of the response abnormality determination to be executed in step S16, the second abnormality determination unit 92 determines whether the control hydraulic pressure has reached a response delay determination reference pressure ax in step S20. The control hydraulic pressure is detected by the control pressure sensor 73. The response delay determination reference pressure ax is preliminarily set as the threshold value based on which the determination is made with respect to the rise-up of the control hydraulic pressure, and stored in the brake ECU 70. The response delay determination reference pressure cc may be set to range between 0.5 and 1.0 MPa, for example.

If the response delay determination reference pressure α is set to be smaller, the control hydraulic pressure reaches such reference pressure α earlier, and accordingly, the rise-up of the control hydraulic pressure may be detected earlier. However, if the response delay determination reference pressure α is set to be too small, the influence resulting from the abnormality in the detected value of the control hydraulic pressure is no longer negligible. It is preferable to set the response delay determination reference pressure cc experimentally in consideration with the aforementioned factors. In the embodiment, the response delay determination reference pressure α is set to a constant value that does not change as time passes. It may be set to be variable with the time, for example, increased accompanied with the target hydraulic pressure.

If it is determined that the control hydraulic pressure has not reached the response delay determination reference pressure α, that is, No is obtained in step S20, the second abnormality determination unit 92 detects the elapsed time from the braking request using a response delay timer in step S22. The response delay timer (not shown) may be installed within the brake ECU 70 or connected thereto.

The second abnormality determination unit 92 determines whether the detected elapsed time has passed a response delay determination reference time T1 in step S24. The response delay determination reference time T1 is preliminarily set as the threshold value used for determining with respect to the response delay abnormality of the control hydraulic pressure, which is stored in the brake ECU 70. The response delay determination reference time T1 is set to be counted from the time point at which the braking request is issued and expires before expiration of the determination allowance time and a control failure determination time T2 (described later). It is preferable to set the response delay determination reference time T1 experimentally likewise the response delay determination reference pressure α. The response delay determination reference time T1 corresponds with the second abnormality determination time in the embodiment.

If it is determined that the count of the response delay timer has passed the response delay determination reference time T1, that is, Yes in step S24, the second abnormality determination unit 92 determines that the response delay abnormality has occurred in step S26. The process for determining the response abnormality in step S16 thus ends. The response delay abnormality may be determined based on the cases where the control hydraulic pressure fails to achieve the rise-up owing to the closing failure in the booster linear control valve 66 or the insufficient flow rate of the brake fluid, and the rise-up in the control hydraulic pressure cannot be detected owing to the failure in the control pressure sensor 73. Meanwhile, if it is determined that the detected time has not passed the response delay determination reference time T1, that is, No is obtained in step S24, the process returns to the abnormality determination process shown in FIG. 2 such that the process for determining the control failure is executed in step S18.

If it is determined that the control hydraulic pressure has reached the response delay determination reference pressure α, that is, Yes is obtained in step S20, the second abnormality determination unit 92 resets the response delay timer in step S28. Thereafter, the process returns to the abnormality determination process shown in FIG. 2 where the process for determining the control failure is executed in step S18.

Figure 4:
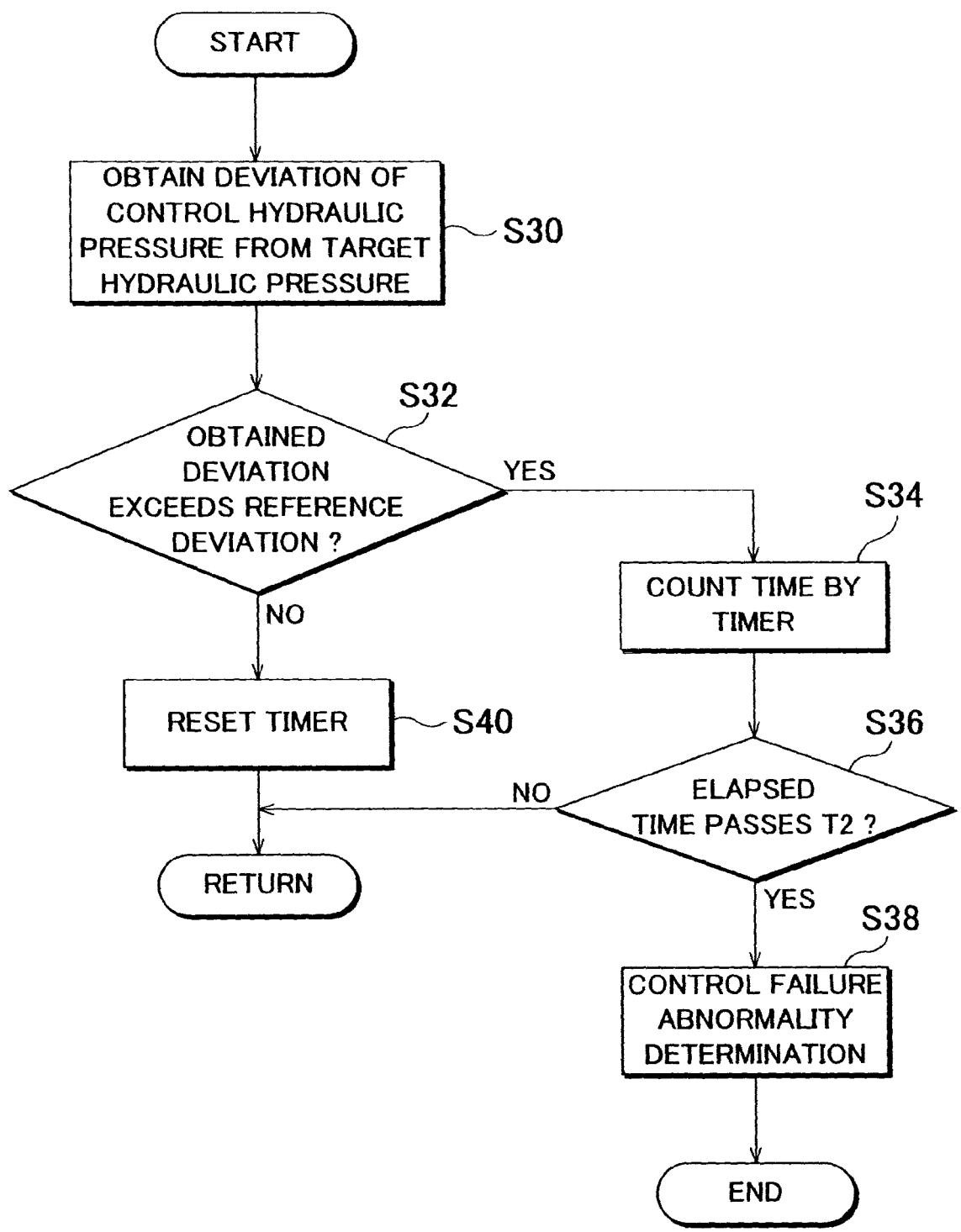
FIG. 4 is a flowchart of a control failure determination process in the first embodiment.

FIG. 4 is a flowchart representing the process for determining the control failure to be executed in step S18 in the first embodiment. Upon start of the control failure determination process S18, the first abnormality determination unit 90 calculates the deviation of the detected control hydraulic pressure from the target hydraulic pressure in step S30. The first abnormality determination unit 90 determines whether the calculated deviation exceeds a reference deviation in step S32. The reference deviation may be set to the constant value, or to the value at a predetermined rate to the target hydraulic pressure. In the embodiment, the reference deviation is set to the constant value of 1 MPa, for example.

If it is determined that the calculated deviation exceeds the reference deviation, that is, Yes is obtained in step S32, the first abnormality determination unit 90 detects the elapsed time counted by the control failure timer in step S34. The time counted by the control failure timer corresponds with the elapsed time from the braking request. In the case where the target hydraulic pressure is smaller than the reference deviation immediately after the braking request, the time count is kept interrupted until the target hydraulic pressure reaches the reference deviation.

The first abnormality determination unit 90 determines whether the time counted by the control failure timer has reached the control failure determination time T2 in step S36. The control failure determination time T2 is preliminarily set as the threshold value for determining with respect to the control failure of the control hydraulic pressure, which is stored in the brake ECU 70. The control failure determination time T2 corresponds with the first abnormality determination time in the embodiment. If it is determined that the time counted by the control failure timer has passed the control failure determination time T2, that is, Yes is obtained in step S36, the first abnormality determination unit 90 determines that the control failure has occurred in step S38. The control failure determination process in step S18, thus, ends. If it is determined that the detected time has not passed the control failure determination time T2, that is, No is obtained in step S36, the abnormality determination process according to the embodiment ends.

Meanwhile, if it is determined that the calculated deviation does not exceed the reference deviation, that is, No is obtained in step S32, the first abnormality determination unit 90 resets the control failure timer in step S40. Thereafter, the abnormality determination process of the embodiment as shown in FIG. 2 ends.

Figure 5:
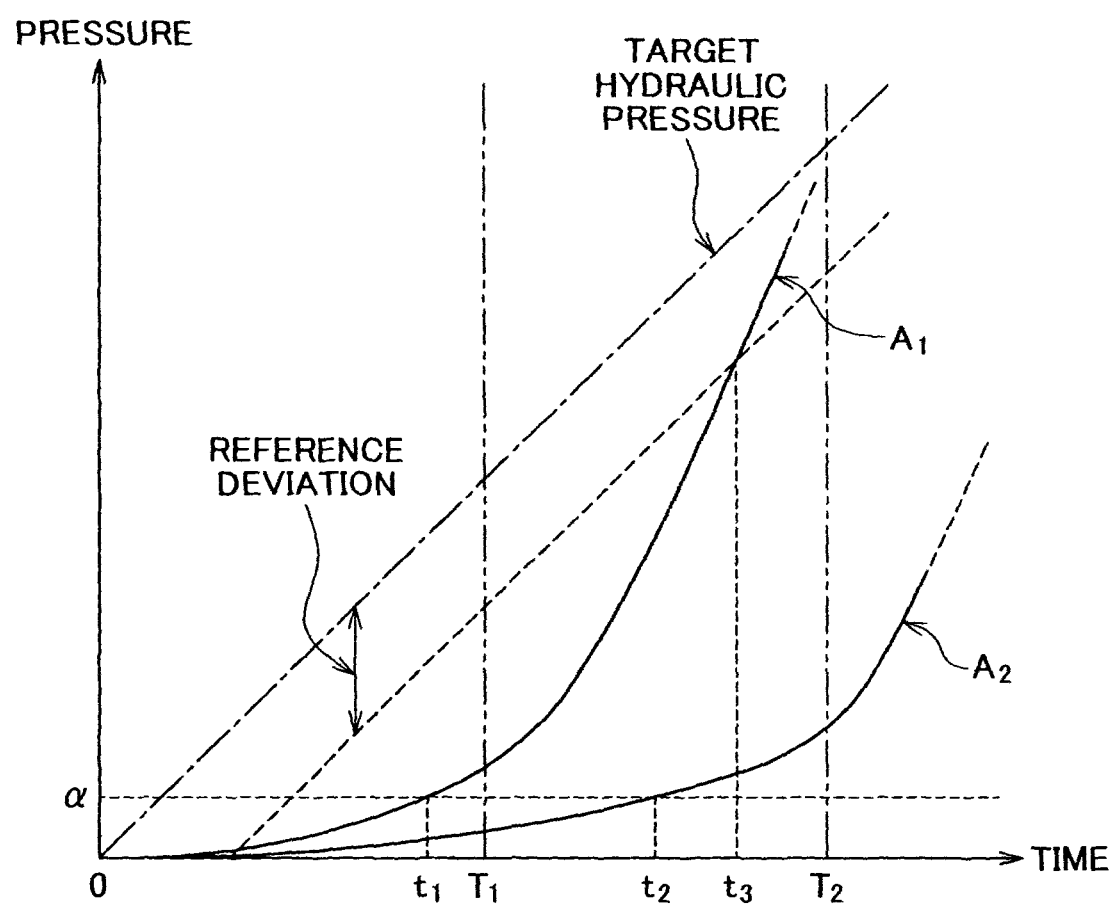
FIG. 5 is a view that shows a control hydraulic pressure in response to the braking request in the first embodiment.

FIG. 5 is a graph representing the control hydraulic pressure in response to the braking request in the first embodiment. The y-axis represents the differential pressure with respect to the atmospheric pressure, and the x-axis represents the time elapsing from the braking request. The operations of the first and the second abnormality determination units 90 and 92 will be described referring to FIG. 5. The response delay determination reference pressure α is represented by the dotted line, and the response delay determination reference time T1 and the control failure determination reference time T2 are represented by chain double-dashed lines, respectively.

FIG. 5 represents the target hydraulic pressure, an initial response A1 of the control hydraulic pressure in the normal state, and an initial response A2 of the control hydraulic pressure in the abnormality state of the excessive response delay, respectively. The target hydraulic pressure indicated by the dashed line as shown in FIG. 5 increases subsequent to the generation of the braking request with the elapse of time. It is to be understood that the target hydraulic pressure shown in FIG. 5 that linearly increases is a mere example.

The normal initial response A1 reaches the response delay determination reference pressure α as the time passes the time point t1 from the braking request. The time point t1 is at the timing before passage of the response delay determination reference time T1. The pressure at the normal initial response A1 continuously increases after passage of the time t1, and it exceeds the response delay determination reference pressure a at the response delay determination reference time T1. The second abnormality determination unit 92, thus, detects no abnormality. Upon passage of the time point t3, the deviation of the pressure of the normal initial response A1 from the target hydraulic pressure becomes smaller than the reference deviation, and thereafter, the pressure follows the target hydraulic pressure. The deviation of the pressure at the normal initial response A1 from the target value upon passage of the control failure determination time T2 is smaller than the reference deviation. The first abnormal determination unit 90, thus, detects no abnormality.

Meanwhile, the pressure of the abnormal initial response A2 has reached the response delay determination reference pressure α upon passage of the time point t2 after the elapse of the response delay determination reference time T1 from the braking request. At the response delay determination reference time T1, the pressure of the abnormal initial response A2 has not reached the response delay determination reference pressure α yet. The second abnormality determination unit 92 detects the response delay abnormality. In this case, the brake ECU 70 switches the control mode from the regenerative braking collaborative control mode to the hydro booster mode without waiting for the determination made by the first abnormality determination unit 90 so as to normally generate the braking force.

In the embodiment, the second abnormality determination unit 92 determines with respect to the abnormality in the wheel cylinder pressure control system based on the time taken for the control hydraulic pressure to reach the response delay determination reference pressure α. The excessive response delay in the control hydraulic pressure owing to the closing failure of the booster linear control valve 66 or the insufficient flow rate of the work fluid may be promptly detected before termination of the determination with respect to the abnormality made by the first abnormality determination unit 90.

In the case where the booster linear control valve 66 is commonly used for supplying the brake fluid to a plurality of wheel cylinders 23, the abnormality may be detected within a predetermined determination allowance time period. If the abnormality such as the closing failure occurs, the control mode may be switched smoothly so as to cope with the insufficient braking force.

In the embodiment, the first abnormality determination unit 90 determines with respect to the abnormality based on the deviation of the control hydraulic pressure from the target hydraulic pressure. The target hydraulic pressure may be replaced by the estimated control pressure. The estimated control pressure may be calculated based on the command current applied to the booster linear control valve 66 for supplying the work fluid to a plurality of wheel cylinders 23, the feature of the flow rate with respect to the command current applied to the booster control valve, and the feature of the fluid consumption of the wheel cylinders 23. This makes it possible to determine whether the control pressure undergoes the normal transition. In this case, the feature of the fluid consumption of the wheel cylinders 23 refers to the relationship between the amount of the brake fluid supplied to the wheel cylinders 23 and the control pressure applied thereto.

Figure 6:
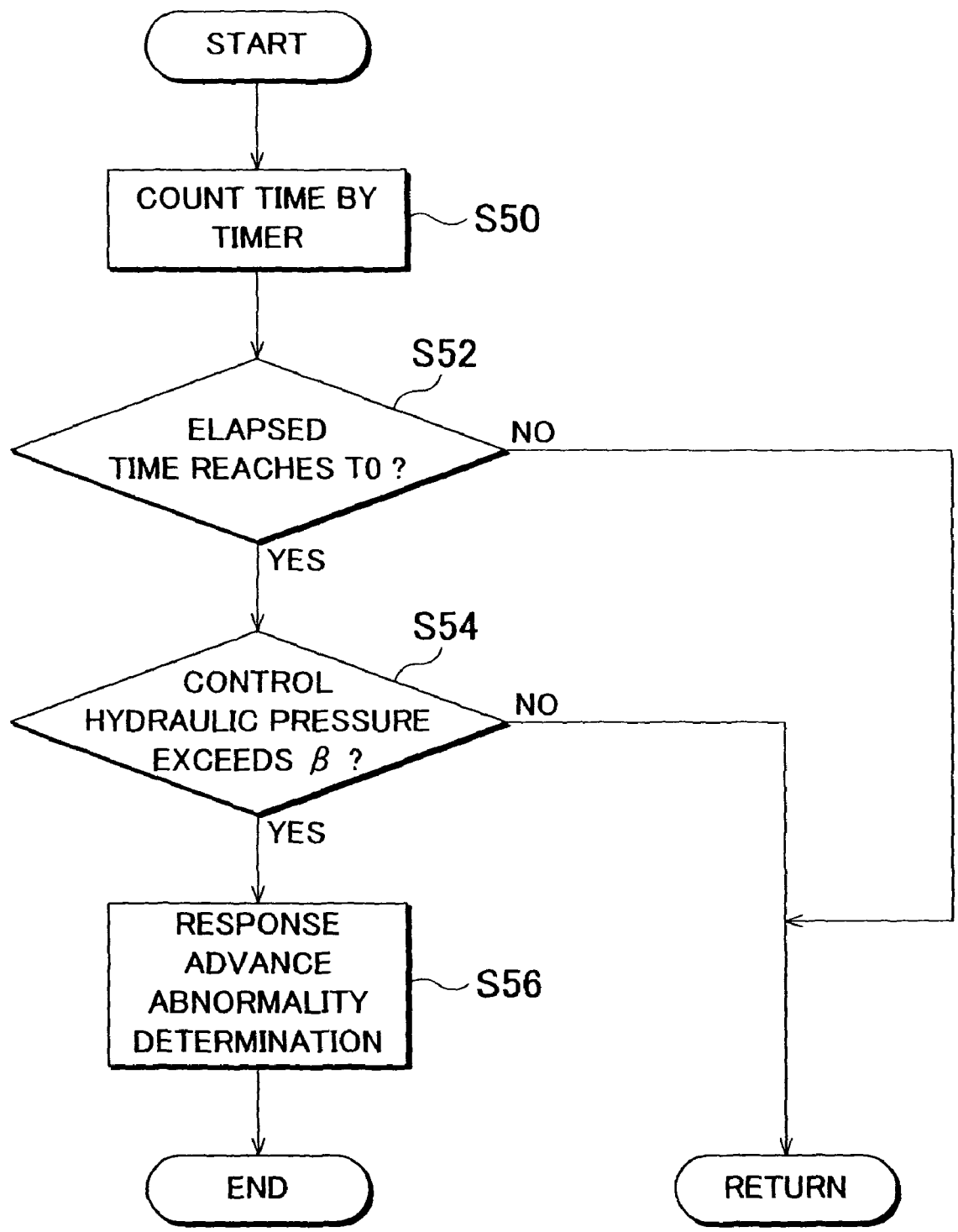
FIG. 6 is a flowchart of a response abnormality determination in a second embodiment.
Figure 7:
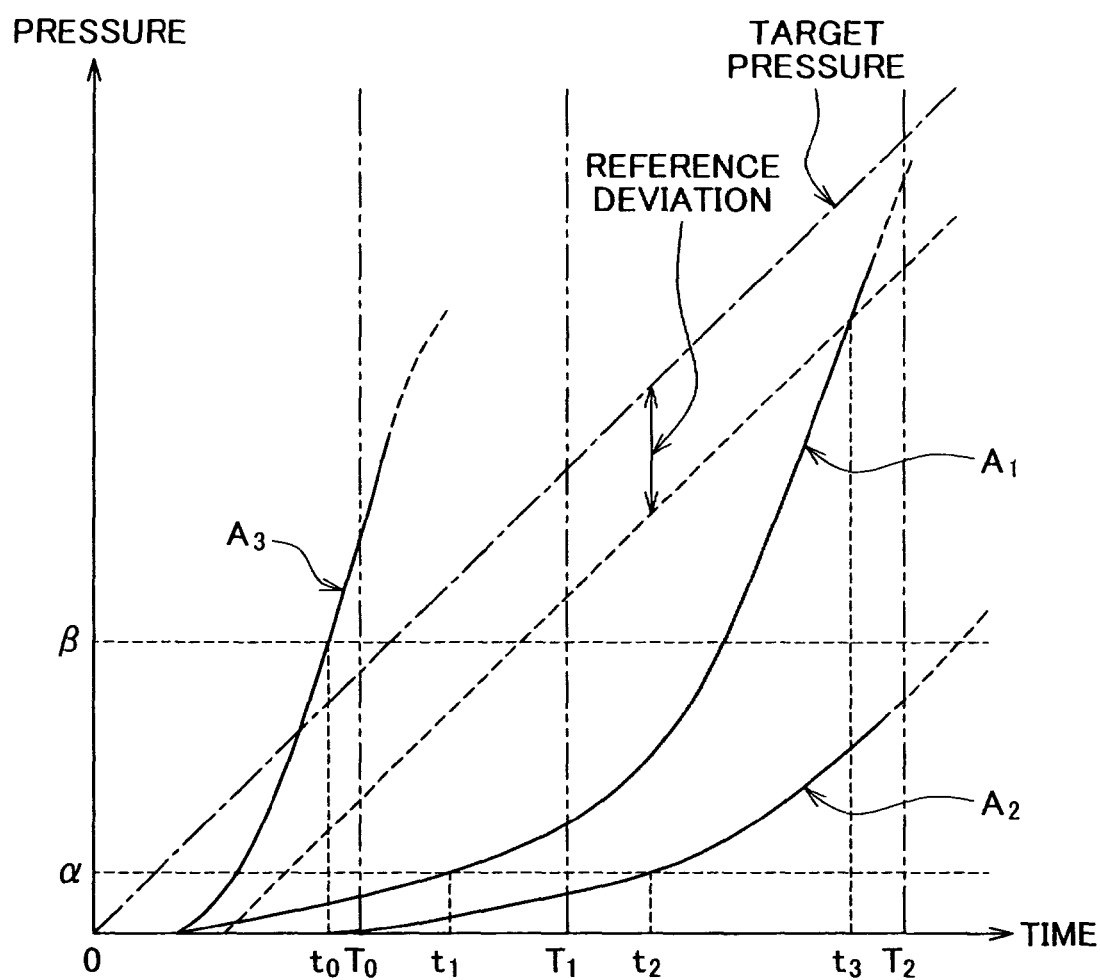
FIG. 7 is a view that shows a control hydraulic pressure upon the braking request in the second embodiment.

A second embodiment of the invention will be described referring to FIGS. 6 and 7. FIG. 6 is a flowchart of a response abnormality determination process to be executed in step S16 according to the second embodiment. FIG. 7 is a graph showing the control hydraulic pressure upon braking request in the second embodiment. The second embodiment is different from the first embodiment in that a response advance reference pressure β is set in addition to the response delay determination reference pressure α used in the first embodiment so as to allow the detection of a response advance abnormality in the control hydraulic pressure immediately after the braking request. The elements of the second embodiment which are the same as those of the first embodiment will not be described.

In the second embodiment, upon start of the response abnormality determination in step S16, the determination process is made with respect to the abnormality based on the control hydraulic pressure and the response delay determination reference pressure α as shown in FIG. 3 as well as the process shown in the flowchart of FIG. 6 simultaneously. The second abnormality determination unit 92 detects the elapsed time from generation of the braking request using the response advance timer in step S50. The response advance timer (not shown) is installed within the brake ECU 70 or connected thereto.

Then the second abnormality determination unit 92 determines whether the detected time has passed a response advance determination reference time T0 in step S52. The response advance determination reference time T0 corresponding to the second abnormality determination time in the embodiment may be set before the response delay determination reference time T1, for example, 100 msecs. subsequent to the braking request. As the response advance abnormality in the control pressure may be detected prior to the detection of the response delay abnormality, generation of the excessive braking force over the required braking force may be promptly suppressed.

If it is determined that the time detected by the response advance timer has not passed the response advance determination reference time T0, that is, No is obtained in step S52, the process returns to the abnormality determination process shown in FIG. 2 so as to execute the control failure determination in step S18 continuously. Meanwhile, if it is determined that the detected time has passed the response advance determination reference time T0, that is, Yes is obtained in step S52, the process proceeds to step S54 where the second abnormality determination unit 92 determines whether the control hydraulic pressure exceeds the response advance determination reference pressure β in step S54. It is preferable to set the response advance determination reference pressure β to the value greater than the target hydraulic pressure at the response advance determination reference time T0. It is unlikely that the control hydraulic pressure exceeds the target hydraulic pressure immediately after the control request. The determination may be made to have the response advance abnormality if the control hydraulic pressure exceeds the target hydraulic pressure at the response advance determination time T0 immediately after the control request.

In the embodiment, the response advance determination reference pressure β is set based on a maximum value γ of the pressure gradients of the control hydraulic pressure that can be generated in the wheel cylinder pressure control system in the normal state at the regenerative braking collaborative control mode. In the embodiment, the response advance determination reference pressure β is calculated by multiplying the product of the maximum pressure gradients γ and the response advance determination reference time T0 by a predetermined determination margin ε. This makes it possible to set the response advance determination reference pressure β to the value greater than the target hydraulic pressure value at the response advance determination reference time T0. Assuming that the maximum pressure gradient value γ is in the range between 30 and 40 MPa/s, the response advance determination reference time T0 is set to 100 msecs, and the determination margin ε is in the range between 10 and 20%, the response advance determination reference pressure β becomes around 4 MPa.

If it is determined that the control hydraulic pressure exceeds the response advance determination reference pressure β, that is, Yes is obtained in step S54, the second abnormality determination unit 92 determines that the response advance abnormality occurs in step S56. Then the response abnormality determination process in step S16 ends. If it is determined that the control hydraulic pressure does not exceed the response advance determination reference pressure β, that is, No is obtained in step S54, the process returns to the abnormality determination process as shown in FIG. 2 such that the control failure determination process is executed in S18 continuously.

FIG. 7 represents an initial response A3 as the excessively rapid response in addition to the target hydraulic pressure, the normal initial response A1, and the initial response A2 with the response delay as shown in FIG. 5. Referring to FIG. 7, the response advance determination reference pressure β is indicated by a dotted line, and the response advance determination reference time T0 is indicated by a chain double-dashed line.

The pressure of the abnormal initial response A3 has already exceeded the target hydraulic pressure to reach the response advance determination reference pressure β when the time passes the time point t0 from the braking request. The control hydraulic pressure further increases continuously to exceed the response advance determination reference pressure β even at the response advance determination reference time T0. In the case where the control hydraulic pressure abruptly increases to exceed the response advance determination reference pressure β at the response advance determination reference time T0, the second abnormality determination unit 92 detects the response advance abnormality. In this case, the brake ECU 70 switches the control mode from the regenerative braking collaborative control mode to the hydro booster mode without waiting for the determination made by the first abnormality determination unit 90. This makes it possible to normally generate the braking force.

In the embodiment, the response advance determination reference pressure β is set in addition to the response delay determination reference pressure α, and the second abnormality determination unit 92 determines with respect to the abnormality based on the comparison between the control hydraulic pressure at the response advance determination reference time T0 and the response advance determination reference value β. This makes it possible to detect not only the response delay abnormality in the control hydraulic pressure but also the response advance abnormality. In the second embodiment, the response delay abnormality and the response advance abnormality may be detected in the second embodiments. It is to be understood that only the response advance abnormality may also be detected.

In the second embodiment, the response advance determination reference pressure β is set as the reference pressure to be compared with the control hydraulic pressure. The target hydraulic pressure or the estimated control pressure may be used as the reference pressure. In the second embodiment, the comparison between the control hydraulic pressure and the reference pressure when the time has reached the response advance determination reference time T0. However, it is not limited to the aforementioned structure. In the case where control hydraulic pressure exceeds the reference pressure within a predetermined time period from the braking force, and such state is held for a predetermined time period continuously from the braking request, and the second abnormality determination unit 92 makes the determination with respect to the response advance abnormality.

Assuming that the pressure reduction linear control valve 67 is normally operated, and the leakage abnormality occurs in the booster linear control valve 66, the operation of the pressure reduction linear control valve 67 for controlling the control hydraulic pressure to be lower than the target hydraulic pressure may be repeatedly performed even if the control hydraulic pressure exceeds the target hydraulic pressure owing to the abnormality in the booster linear control valve 66. In the aforementioned case, the determination with respect to the abnormality may be determined based on the number of times where the control hydraulic pressure exceeds the reference pressure within the response advance determination reference value T0, or the total length of time for which the pressure exceeds the reference pressure.

In the embodiments, an abnormality determination with respect to an abnormality in the wheel cylinder pressure control system is made based on an initial response of the control pressure after a braking request within a predetermined first abnormality determination time and based on a comparison between the control pressure and a reference pressure within a predetermined second abnormality determination time. However, an abnormality determination may be made not only based on a specific reference pressure, but also based on a specific gradient, a combination of a specific reference pressure and a specific gradient, or any other time dependent characteristic criteria such as the process of control pressure build-up, e.g. curvature, change of gradient, etc., over a given period of time.

What is claimed is:

1. A brake control system comprising:
at least one wheel cylinder that receives a supply of a work fluid so as to apply a braking force to a respective vehicle wheel;
a wheel cylinder pressure control system that controls a control pressure applied to the at least one wheel cylinder by controlling the supply of the work fluid to the at least one wheel cylinder; and
a first abnormality determination unit that determines, during a single braking operation, whether an abnormality in the wheel cylinder pressure control system is present based on a comparison between a calculated pressure obtained in accordance with a required braking force and the control pressure after a braking request, which initiates the single braking operation, within a predetermined first abnormality determination time; and
a second abnormality determination unit that determines, during the single braking operation, whether the abnormality in the wheel cylinder pressure control system is present based on a comparison between the control pressure and a reference pressure based on which a determination is made with respect to the abnormality within a predetermined second abnormality determination time that is set to expire before expiration of the first abnormality determination time.

2. The brake control system according to claim 1, wherein the wheel cylinder pressure control system includes a booster control valve that is commonly used for supplying the work fluid to a plurality of wheel cylinders.

3. The brake control system according to claim 1, wherein the first abnormality determination unit determines that the wheel cylinder pressure control system has the abnormality if a time at which a deviation of the control pressure from the calculated pressure exceeds a predetermined reference deviation has reached the first abnormality determination time.

4. The brake control system according to claim 1, wherein the calculated pressure comprises a target value of the control pressure.

5. The brake control system according to claim 1, wherein the calculated pressure comprises an estimated control pressure obtained based on a command current applied to the booster control valve for supplying the work fluid to the at least one wheel cylinder, a feature of a flow rate to the command current applied to the booster control valve, and a feature of a fluid consumption amount of the at least one wheel cylinder.

6. The brake control system according to claim 1, wherein:
the reference pressure comprises a predetermined response delay determination reference pressure based on which a determination is made with respect to a response delay abnormality in the control pressure; and
the second abnormality determination unit determines with respect to the abnormality in the wheel cylinder pressure control system based on a time taken for the control pressure to reach the response delay determination reference pressure.

7. The brake control system according to claim 6, wherein the second abnormality determination unit determines that the wheel cylinder pressure control system has the abnormality if a time taken for the control pressure to reach the response delay determination reference pressure exceeds the second abnormality determination time.

8. The brake control system according to claim 6, wherein the response delay determination reference pressure is set to a predetermined low pressure value as a threshold value based on which a determination is made with respect to a rise-up of the control pressure to the target value.

9. A method for determining an abnormality within a brake control system comprising at least one wheel cylinder that receives a supply of a work fluid so as to apply a braking force to a respective vehicle wheel, and a wheel cylinder pressure control system that controls a control pressure applied to the at least one wheel cylinder by controlling the supply of the work fluid to the at least one wheel cylinder; comprising the steps of:
determining, during a single braking operation, whether an abnormality in the wheel cylinder pressure control system is present based on a comparison between a calculated pressure obtained in accordance with a required braking force and the control pressure after a braking request, which initiates the single braking operation, within a predetermined first abnormality determination time; and
determining, during the single braking operation, whether the abnormality in the wheel cylinder pressure control system is present based on a comparison between the control pressure and a reference pressure within a predetermined second abnormality determination time that is set to expire before expiration of the first abnormality determination time.

10. A brake control system comprising:
at least one wheel cylinder that receives a supply of a work fluid so as to apply a braking force to a respective vehicle wheel;
a wheel cylinder pressure control system that controls a control pressure applied to the at least one wheel cylinder by controlling the supply of the work fluid to the at least one wheel cylinder; and
first abnormality determination means for determining, during a single braking operation, whether an abnormality in the wheel cylinder pressure control system is present based on a comparison between a calculated pressure obtained in accordance with a required braking force and the control pressure after a braking request, which initiates the single braking operation, within a predetermined first abnormality determination time; and
second abnormality determination means for determining, during the single braking operation, whether the abnormality in the wheel cylinder pressure control system is present based on a comparison between the control pressure and a reference pressure based on which a determination is made with respect to the abnormality within a predetermined second abnormality determination time that is set to expire before expiration of the first abnormality determination time.

11. The brake control system according to claim 1, wherein the predetermined first abnormality determination time is counted from a time point at which the braking request is issued, and the predetermined second abnormality determination time is counted from the time point at which the braking request is issued.

12. The method for determining an abnormality within a brake control system according to claim 9, wherein the predetermined first abnormality determination time is counted from a time point at which the braking request is issued, and the predetermined second abnormality determination time is counted from the time point at which the braking request is issued.

13. The brake control system according to claim 10, wherein the predetermined first abnormality determination time is counted from a time point at which the braking request is issued, and the predetermined second abnormality determination time is counted from the time point at which the braking request is issued.

* * * * *